(12) United States Patent
Lee

(10) Patent No.: US 11,506,355 B2
(45) Date of Patent: Nov. 22, 2022

(54) LAMP FOR VEHICLE AND VEHICLE INCLUDING THE SAME

(71) Applicant: HYUNDAI MOBIS CO., LTD., Seoul (KR)

(72) Inventor: Hyun Soo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/407,475

(22) Filed: Aug. 20, 2021

(65) Prior Publication Data

US 2022/0268413 A1 Aug. 25, 2022

(30) Foreign Application Priority Data

Feb. 24, 2021 (KR) .................. 10-2021-0024910

(51) Int. Cl.
| | |
|---|---|
| *F21S 41/265* | (2018.01) |
| *F21S 41/143* | (2018.01) |
| *F21S 41/24* | (2018.01) |
| *F21V 5/00* | (2018.01) |
| *F21V 7/00* | (2006.01) |
| *F21V 13/04* | (2006.01) |
| *F21V 13/12* | (2006.01) |

(Continued)

(52) U.S. Cl.
CPC .......... *F21S 41/265* (2018.01); *F21S 41/143* (2018.01); *F21S 41/24* (2018.01); *F21S 41/25* (2018.01); *F21S 41/285* (2018.01); *F21S 41/332* (2018.01); *F21V 5/002* (2013.01); *F21V 5/004* (2013.01); *F21V 5/005* (2013.01); *F21V 7/0091* (2013.01); *F21V 13/04* (2013.01); *F21V 13/12* (2013.01)

(58) Field of Classification Search
CPC ......... F21V 5/045; F21S 41/24; F21S 41/265; F21S 41/322; F21S 41/40; F21S 41/43
See application file for complete search history.

(56) References Cited

U.S. PATENT DOCUMENTS 6,161,952 A * 12/2000 Schuster ................. F21V 5/045
362/333
7,580,192 B1 * 8/2009 Chu ...................... F21V 7/0091
359/708

(Continued)

FOREIGN PATENT DOCUMENTS

| DE | 102012108175 A1 * | 3/2014 | ............ F21S 41/147 |
|---|---|---|---|
| JP | 2005-340052 A | 12/2005 | |

(Continued)

OTHER PUBLICATIONS

Office Action dated Jul. 12, 2022 in the corresponding Korean Patent Application No. 10-2021-0024910.

*Primary Examiner* — Colin J Cattanach
(74) *Attorney, Agent, or Firm* — NovoTechIP International PLLC

(57) ABSTRACT

Disclosed are a lamp for a vehicle and a vehicle including the same, the lamp including: a light source configured to emit light beams; a first optical part provided in front of the light source; and a second optical part provided in front of the first optical part, in which the second optical part includes: an MFL region including a plurality of facet lenses and having level differences on boundaries between the plurality of facet lenses; and a convex lens region provided at one side of the MFL region and having a shape convex forward.

15 Claims, 3 Drawing Sheets

(51) Int. Cl.
    *F21S 41/25*     (2018.01)
    *F21S 41/33*     (2018.01)
    *F21S 41/20*     (2018.01)

(56) References Cited

U.S. PATENT DOCUMENTS

2004/0213001 A1* 10/2004 Sayers .................... F21V 5/045
    362/555
2006/0250811 A1* 11/2006 Wu ........................ F21V 13/12
    362/520

FOREIGN PATENT DOCUMENTS

| | | | |
|---|---|---|---|
| KR | 10-1950749 B1 | 2/2019 | |
| WO | WO-2016096597 A1 * | 6/2016 | ........... B60Q 1/0041 |
| WO | WO-2017198516 A1 * | 11/2017 | ........... F21S 41/143 |

* cited by examiner

LAMP FOR VEHICLE AND VEHICLE INCLUDING THE SAME

CROSS-REFERENCE TO RELATED APPLICATIONS

This application claims priority to and the benefit of Korean Patent Application No. 10-2021-0024910 filed in the Korean intellectual Property Office on Feb. 24, 2021, the entire contents of which are incorporated herein by reference.

BACKGROUND OF THE INVENTION

1. Field of the Invention

The present disclosure relates to a lamp for a vehicle, and a vehicle including the lamp.

2. Discussion of Related Art

Various types of vehicle lamps, which may be classified based on functions, are mounted in a vehicle. For example, low beam lamps, high beam lamps, daytime running light (DRL) lamps, and the like are mounted on the front side of the vehicle.

Various types of lenses may be mounted in the vehicle lamps. For example, the vehicle lamp may have a multi-facet lens (MFL) having a plurality of facet lenses. In the case of the vehicle lamp mounted with the MFL, the plurality of facet lenses of the MFL individually form unit light distribution patterns, respectively, and the respective unit light distribution patterns are combined to define a single light distribution pattern having a predetermined shape. In particular, in comparison with other types of lenses, the MFL advantageously reduces a size of the vehicle lamp.

Meanwhile, a light source such as an LED mounted in the vehicle lamp has a predetermined size in an upward-downward direction of the lamp. For this reason, there is a problem in the related art in that the performance of the light distribution pattern of the vehicle lamp mounted with the MFL deteriorates. The vehicle lamp is often designed based on the premise that the light source is a point light source. However, because the actual light source has a predetermined size in the upward-downward direction, there is a problem in that the aberration determined based on the size of the light source is applied, without change, to the light distribution pattern. This problem more severely affects the vehicle lamp mounted with the MFL that forms the unit light distribution patterns using light beams exiting the plurality of facets and defines the single beam pattern by combining the respective unit light distribution patterns. The regulations and performance required for the vehicle lamp cannot be satisfied due to this problem.

BRIEF SUMMARY OF THE INVENTION

The present disclosure has been made in an effort to provide a lamp for a vehicle that has a multi-facet lens (MFL) with improved performance of a light distribution pattern.

In one aspect, the present disclosure provides a lamp for a vehicle, the lamp including: a light source configured to emit light beams; a first optical part provided in front of the light source; and a second optical part provided in front of the first optical part, in which the second optical part includes: an MFL region including a plurality of facet lenses and having different levels at a plurality of boundaries of the plurality of facet lenses; and a convex lens region provided at a portion of the MFL region and having a convex shaping protruding forward.

The MFL region and the convex lens region may be provided to be in close contact with each other or integrated with each other.

The convex lens region may be provided in a central area of the second optical part.

The MFL region may surround the convex lens region.

The first optical part may include: a collimator region configured to receive the light beams emitted from the light source and then emit the light beams as parallel light beams; and a light guide region protruding forward from the collimator region and configured to receive at least some of the light beams emitted from the collimator region.

Portions of the collimator region, except for a portion connected to the light guide region, may face the MFL region, and the light guide region may face the convex lens region.

The convex lens region may include a lens having an aspherical shape.

The light guide region may be shaped such that a size of a cross-sectional area of the light guide region is inversely proportional to a distance from the second optical part.

The light guide region may have a surface including a cut-off portion, and the cut-off portion may have a step shape.

The cut-off portion may be formed on a lower surface of the light guide region.

The light guide region may have an upper surface portion extending parallel to a horizontal direction of the lamp.

The light guide region may have a lower surface portion extending inclined with respect to a horizontal direction of the lamp.

A front portion of the light guide region may be provided at a position corresponding to a focal point of the convex lens region.

A size and shape of a rear portion of the light guide region may correspond to those of the convex lens region.

In another aspect, the present disclosure provides a vehicle including: a lamp for a vehicle, in which the lamp includes: a light source configured to emit light beams; a first optical part provided in front of the light source; and a second optical part provided in front of the first optical part, in which the first optical part includes: a collimator region configured to receive the light beams emitted from the light source and then emit the light beams as parallel light beams; and a light guide region protruding forward from the collimator region and configured to receive at least some of the light beams emitted from the collimator region, and in which the second optical part includes: an MFL region including a plurality of facet lenses and having different levels at a plurality of boundaries of the plurality of facet lenses; and a convex lens region provided at a portion of the MFL region and having a convex shaping protruding forward.

The lamp may form a predetermined light distribution pattern, and the light distribution pattern may include: a first light distribution pattern formed by a first light beam which is emitted from the light source and propagates externally through the collimator region, the light guide region, and the convex lens region; and a second light distribution pattern formed by a second light beam which is emitted from the light source and propagates externally through the collimator region and the MFL region.

The second light distribution pattern may surround the first light distribution pattern.

According to the present disclosure, it is possible to improve the performance of the light distribution pattern of the lamp for a vehicle that has the MFL.

DETAILED DESCRIPTION OF THE INVENTION

Hereinafter, a lamp for a vehicle and vehicle according to the present disclosure will be described with reference to the drawings.

LAMP FOR VEHICLE

Figure 1:
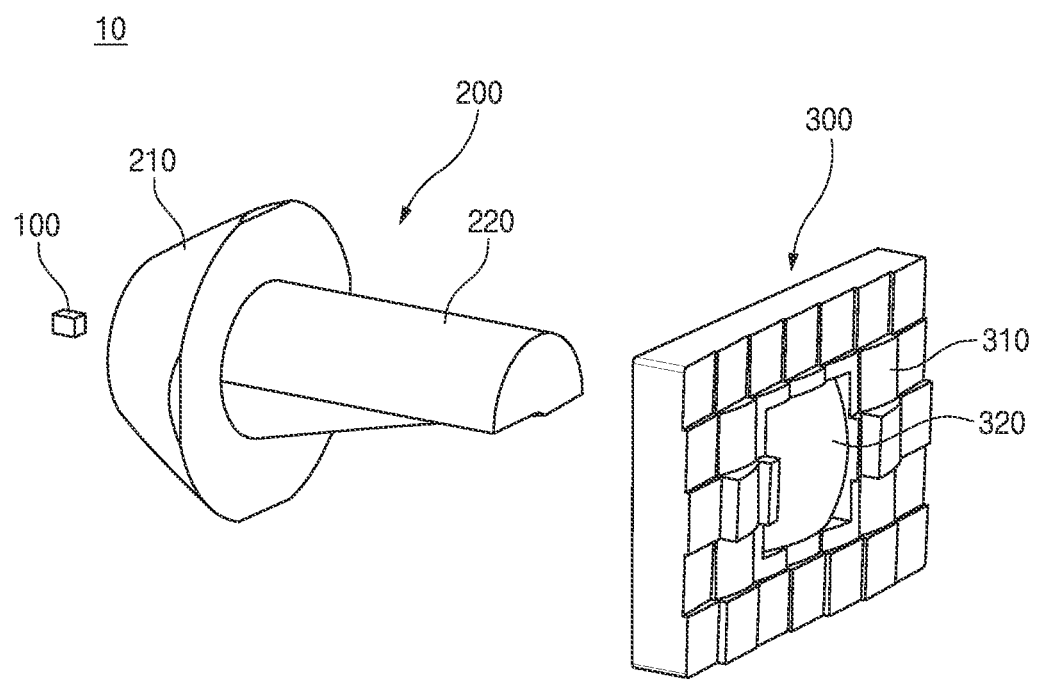
FIG. 1 is a perspective view illustrating a structure of a lamp for a vehicle according to the present disclosure.
Figure 2:
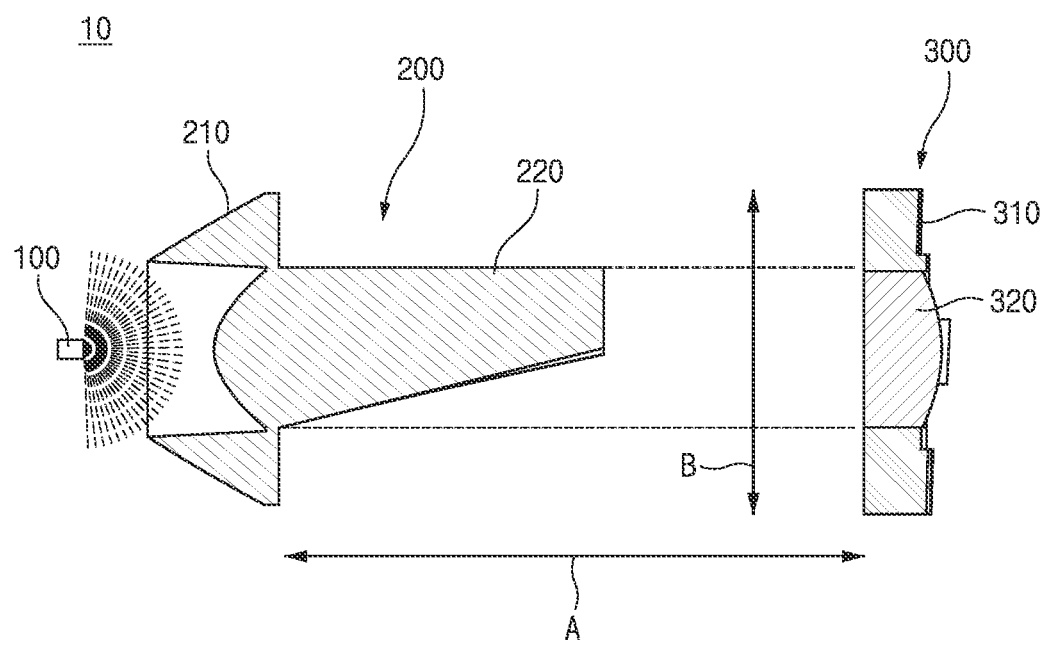
FIG. 2 is a cross-sectional side view illustrating the structure of the lamp for a vehicle according to the present disclosure.

FIG. 1 is a perspective view illustrating a structure of a lamp for a vehicle according to the present disclosure, and FIG. 2 is a cross-sectional side view illustrating the structure of the lamp for a vehicle according to the present disclosure. In addition, FIG. 3 is an enlarged view of an end portion of a light guide region provided in the lamp for a vehicle according to the present disclosure.

Figure 3:
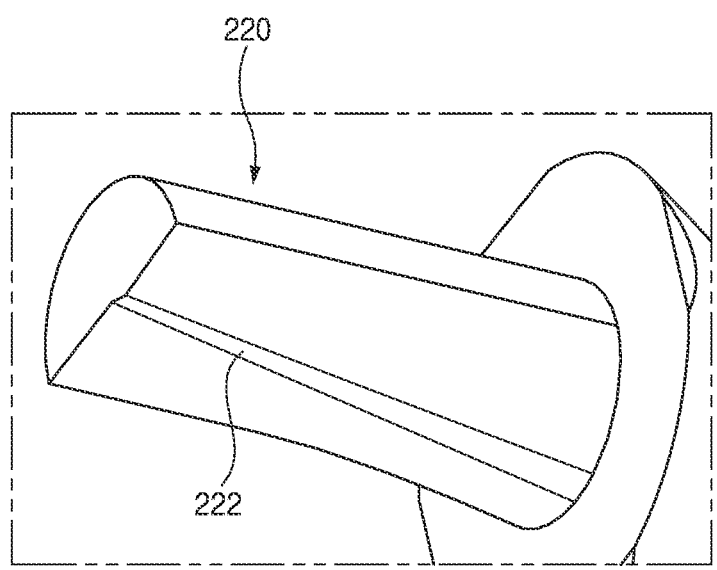
FIG. 3 is an enlarged view of an end portion of a light guide region provided in the lamp for a vehicle according to the present disclosure.

Referring to FIGS. 1 to 3, a lamp 10 for a vehicle (hereinafter, referred to as a 'lamp') according to the present disclosure may include a light source 100 configured to emit light beams, a first optical part 200 provided in front of the light source 100, and a second optical part 300 provided in front of the first optical part 200. In the present specification, a direction in which the light source 100, the first optical part 200, and the second optical part 300 are disposed is defined as a forward-rearward direction A of the lamp 10.

For example, the light source 100 may be an LED, but the present disclosure is not limited to the type of light source 100. In addition, the first optical part 200 and the second optical part 300 may be made of a material capable of transmitting light.

The first optical part 200 may include a collimator region 210 configured to receive the light beams emitted from the light source 100 and then emit the light beams as parallel light beams, and a light guide region 220 protruding forward from the collimator region 210 and configured to receive at least some of the light beams emitted from the collimator region 210.

As illustrated in the drawings, a size of a cross-section made by cutting the collimator region 210 in a direction perpendicular to the forward-rearward direction A may be larger than a size of a cross-section made by cutting the light guide region 220 in the direction perpendicular to the forward-rearward direction A. Therefore, according to the present disclosure, some of the light beams, which are emitted from the light source 100 and enter the collimator region 210, may exit the collimator region 210 and then enter the light guide region 220. Some of the light beams may exit the collimator region 210 and then propagate externally without entering the light guide region 220.

Meanwhile, the second optical part 300 may include an MFL region 310 including a plurality of facet lenses and having ldifferent levels at a plurality of boundaries of the plurality of facet lenses, and a convex lens region 320 provided at a portion of the MFL region 310 having a convex shape protruding forward.

In more detail, the MFL region 310 and the convex lens region 320 may be in close contact with each other. For example, in a case in which the MFL region 310 and the convex lens region 320 are provided separately, the MFL region 310 and the convex lens region 320 may be assembled. In contrast, the MFL region 310 and the convex lens region 320 may be integrated. Meanwhile, as illustrated in FIG. 1, a part of a surface in a front area of the convex lens region 320 may be positioned rearward from a front area of the MFL region 310. For example, a peripheral area of the convex lens region 320 may be positioned rearward from the MFL region 310, and a central area of the convex lens region 320 may be positioned forward from the MFL region 310. However, on the contrary, the entire front area of the convex lens region 320 may be positioned forward from the MFL region 310.

Referring to the drawings, the convex lens region 320 may be provided in a central area of the second optical part 300. For example, as illustrated in FIG. 1, the convex lens region 320 may be disposed in the central area of the second optical part 300, and the central area is a center in an upward-downward direction and a leftward-rightward direction of the lamp 10.

In addition, the MFL region 310 may surround the convex lens region 320. More particularly, the MFL region 310 surrounds the convex lens region 320 in the upward-downward direction and the leftward-rightward direction of the lamp 10.

Meanwhile, according to the present disclosure, portions of the collimator region 210, except for a portion connected to the light guide region 220, may face the MFL region 310 of the second optical part 300, and the light guide region 220 may face the convex lens region 320. Therefore, according to the present disclosure, some of the light beams, which are emitted from the light source 100 and enter the light guide region 220, may exit the light guide region 220 and then reach the convex lens region 320. At least some of the light beams, which are emitted from the light source 100 and reach the collimator region 210, except for the light beams entering the light guide region 220, may reach the MFL region 310. As described below, the light beams propagating to the outside from the convex lens region 320 may form a first light distribution pattern, and the light beams propagating to the outside from the MFL region 310 may form a second light distribution pattern. The first light distribution pattern and the second background pattern are combined to define a predetermined light distribution pattern formed by the lamp 10 according to the present disclosure. Meanwhile, according to the present disclosure, the convex lens region 320 may include a lens having an aspherical shape or have an aspherical shape. However, the present disclosure is not limited thereto, and the convex lens region 320 may include various shapes such as a spherical surface lens.

According to the present disclosure, the convex lens region 320 is provided in addition to the MFL region 310 having the plurality of facet lenses provided in the second optical part 300. Therefore, it is possible to solve the problem of the deterioration in performance of the light distribution pattern which is caused when only the MFL is provided at a position corresponding to the second optical part 300 in the related art.

That is, according to the present disclosure, the MFL region 310 is provided in the second optical part 300, and a part of the light distribution pattern is formed by the light beams exiting the MFL region 310. Therefore, it is possible to obtain the advantage of the MFL. Further, the convex lens region 320 is provided in an area in which the performance of the light distribution pattern may significantly deteriorate when the MFL is provided. Therefore, it is possible to minimize the drawback of the MFL.

In particular, the lamp according to the present disclosure may be a lamp capable of forming a low beam pattern. In the related art, there is a problem in that the performance of the light distribution pattern significantly deteriorates at a periphery of a cut-off line in a case in which the MFL is provided in a lamp for forming a low beam pattern. However, according to the present disclosure, the convex lens region 320 is provided as a part of the second optical part 300, which makes it possible to significantly improve the performance of the low beam pattern. To this end, the light beams exiting the convex lens region 320 may reach the cut-off line and the periphery of the cut-off line of the low beam pattern.

Referring to the drawings, according to the present disclosure, the light guide region 220 may have a shape having a cross-section which is made by cutting the light guide region 220 in the direction perpendicular to the forward-rearward direction A of the lamp 10 and has a size that decreases as a distance from the second optical part 300 decreases. In other words, a size of a cross-sectional area of the light guide region may be inversely proportional to a distance from the second optical part. This configuration may mean that the light guide region 220 has a shape having a width in the upward-downward direction and the leftward-rightward direction that decreases forward, as illustrated in FIGS. 1 and 2. In this case, the light beams having entered the light guide region 220 may be collected while propagating forward in the light guide region 220, which makes it possible to increase the intensity of the light beams that exit the light guide region 220 and then enter the convex lens region 320.

More particularly, as illustrated in the drawings, according to the present disclosure, the light guide region 220 may be parallel to the forward-rearward direction A or a horizontal direction of the lamp 10. The light guide region 220 may be shaped such that an upper periphery of a cross-section, which is made by cutting the light guide region 220 in a direction parallel to the upward-downward direction B of the lamp 10, is parallel to the forward-rearward direction A of the lamp 10. In other words, the light guide region 220 may have an upper surface portion extending parallel to the horizontal direction of the lamp. In contrast, the light guide region 220 may be parallel to the forward-rearward direction A of the lamp 10, and a lower periphery of a cross-section, which is made by cutting the light guide region 220 in the direction parallel to the upward-downward direction B of the lamp 10, may be inclined. In other words, the light guide region 220 may have a lower surface portion extending inclined with respect to a horizontal direction of the lamp.

Meanwhile, as described above, the lamp 10 according to the present disclosure may he configured to form the low beam pattern. Meanwhile, a cut-off line is formed in an upper region of the low beam pattern. To this end, according to the present disclosure, the light guide region 220 may include a cut-off portion 222 on a surface thereof. The cut-off portion may have a shape stepped in the upward-downward direction of the lamp 10. Therefore, according to the present disclosure, the light beams, which are emitted from the light source 100 and enter the light guide region 220, may exit the light guide region 220 and then enter the convex lens region 320, thereby forming the cut-off line of the low beam pattern and the light distribution pattern in the peripheral area.

In this case, the cut-off portion 222 may be formed on a lower surface of the light guide region 220. Therefore, according to the present disclosure, the light beams exiting the light guide region 220 may propagate externally in a state of being inverted in the upward-downward direction.

More particularly, according to the present disclosure, a front portion of the light guide region 220 may be provided at a position corresponding to a focal point of the convex lens region 320. This configuration may be interpreted as including not only a case in which the front portion of the light guide region 220 is coincident with the focal point of the convex lens region 320, but also a case in which the front portion of the light guide region 220 is spaced apart from the focal point of the convex lens region 320 to the extent that the performance of the light distribution pattern is not greatly affected in comparison with the case in which the front portion of the light guide region 220 is coincident with the focal point of the convex lens region 320.

Meanwhile, according to the present disclosure, a size and shape of a rear portion of the light guide region 220 may correspond to those of the convex lens region 320. More particularly, the size and shape of the rear portion of the light guide region 220 may correspond to those of a figure made by projecting the convex lens region 320 onto an imaginary plane perpendicular to the forward-rearward direction A.

VEHICLE

Vehicles according to the present disclosure may include not only internal-combustion-engine vehicles, but also hybrid vehicles, pure electric vehicles, and mobility vehicles.

The vehicle according to the present disclosure may include the lamp 10 for a vehicle. In this case, the lamp 10 may include the light source 100 configured to emit light beams, the first optical part 200 provided in front of the light source 100, and the second optical part 300 provided in front of the first optical part 200. In addition, the first optical part 200 may include the collimator region 210 configured to receive the light beams emitted from the light source 100 and then emit the light beams as parallel light beams, and the light guide region 220 protruding forward from the collimator region 210 and configured to receive at least some of the light beams emitted from the collimator region 210. In addition, the second optical part 300 may include the MFL region 310 including the plurality of facet lenses and having the different levels at a plurality of boundaries of the plurality of facet lenses, and the convex lens region 320 provided at a portion of the MFL region 310 having a convex shaping protruding forward.

Meanwhile, the detailed description for the lamp 10 provided in the vehicle according to the present disclosure may be replaced with the above-mentioned description for the lamp according to the present disclosure.

Meanwhile, the lamp 10 provided in the vehicle according to the present disclosure may form a predetermined light distribution pattern. For example, the light distribution pattern may be the low beam pattern.

In this case, the light distribution pattern may include a first light distribution pattern and a second light distribution pattern. The first light distribution pattern is formed by a first light beam which is emitted from the light source 100 and propagates externally through the collimator region 210, the light guide region 220, and the convex lens region 320. The second light distribution pattern is formed by a second light beam which is emitted from the light source 100 and propagates externally through the collimator region 210 and the MFL region 310. More particularly, a cut-off line may be formed on an upper boundary of the first light distribution pattern, and the second light distribution pattern may surround the first light distribution pattern.

Meanwhile, the above-mentioned description of the lamp provided in the vehicle according to the present disclosure may also be equally applied to the lamp according to the present disclosure.

The present disclosure has been described with reference to the limited embodiments and the drawings, but the present disclosure is not limited thereto. The present disclosure may be carried out in various forms by those skilled in the art to which the present disclosure pertains within the technical spirit of the present disclosure and within the scope equivalent to the appended claims.

What is claimed is:

1. A lamp for a vehicle, the lamp comprising:
   a light source configured to emit a plurality of light beams including first and second light beams;
   a first optical part positioned in front of the light source and comprising:
      a collimator region configured to receive the plurality of light beams emitted from the light source and transmit the received plurality of light beams as a plurality of parallel light beams; and
      a light guide region protruding forward from the collimator region and configured to receive the second light beam from the collimator region and transmit the received second light beam;
   a second optical part positioned in front of the first optical part and comprising:
      a multi-facet lens (MFL) region comprising a plurality of facet lenses having different levels at a plurality of boundaries of the plurality of facet lenses, and configured to receive the first light beam directly from the collimator region of the first optical part and generate a first light distribution pattern based on the received first light beam; and
      a convex lens region adjoining the MFL region, having a convex shape protruding forward, and configured to receive the second light beam from the light guide region of the first optical part and generate a second light distribution pattern based on the received second light beam.

2. The lamp of claim 1, wherein the MFL region and the convex lens region are integrated with each other.

3. The lamp of claim 1, wherein the convex lens region is positioned in a central area of the second optical part.

4. The lamp of claim 3, wherein the MFL region is positioned to surround the convex lens region.

5. The lamp of claim 1, wherein:
   the collimator region comprises a first portion connected to the light guide region and a second region positioned to face the MFL region of the second optical part, and
   the light guide region is positioned to face the convex lens region of the second optical part.

6. The lamp of claim 1, wherein the convex lens region comprises a lens having an aspherical shape.

7. The lamp of claim 1, wherein a size of a cross-sectional area of the light guide region is inversely proportional to a distance from the second optical part.

8. The lamp of claim 1, wherein the light guide region comprises a surface having a step-shaped cut-off portion.

9. The lamp of claim 8, wherein the surface of the light guide region having the cut-off portion comprises a lower surface of the light guide region.

10. The lamp of claim 1, wherein the light guide region has an upper surface portion extending parallel to a horizontal direction of the lamp.

11. The lamp of claim 1, wherein the light guide region has a lower surface portion extending inclined with respect to a horizontal direction of the lamp.

12. The lamp of claim 1, wherein the light guide region has a front portion positioned to correspond to a focal point of the convex lens region.

13. The lamp of claim 1, wherein the light guide region has a rear portion having a size and shape corresponding to those of the convex lens region.

14. A vehicle comprising a lamp, wherein the lamp comprises:
   a light source configured to emit light beams;
   a first optical part positioned in front of the light source; and
   a second optical part positioned in front of the first optical part,
   wherein the first optical part comprises:
      a collimator region configured to receive the light beams emitted from the light source and emit the light beams as a plurality of parallel light beams; and
      a light guide region protruding forward from the collimator region and configured to receive at least some of the plurality of parallel light beams emitted from the collimator region, and
   wherein the second optical part comprises:
      a multi-facet lens (MFL) region comprising a plurality of facet lenses having different levels at a plurality of boundaries of the plurality of facet lenses; and
      a convex lens region provided at a portion of the MFL region and having a convex shape protruding forward, wherein the lamp
   is configured to form a predetermined light distribution pattern comprising:
      a first light distribution pattern formed by a first light beam emitted from the light source and propagating externally through the collimator region, the light guide region and the convex lens region; and
      a second light distribution pattern formed by a second light beam emitted from the light source and propagating externally through the collimator region and the MFL region, and
   wherein the second light beam propagates through the collimator region and directly to the MFL region.

15. The vehicle of claim 14, wherein the second light distribution pattern surrounds the first light distribution pattern.

* * * * *